(12) United States Patent
Jørgensen

(10) Patent No.: US 7,438,275 B2
(45) Date of Patent: Oct. 21, 2008

(54) BALL VALVE FOR USE IN HEATING OR COOLING SYSTEMS

(75) Inventor: Ole Jørgensen, Slagelse (DK)

(73) Assignee: Frese A/S, Slagelse (DK)

( * ) Notice: Subject to any disclaimer, the term of this patent is extended or adjusted under 35 U.S.C. 154(b) by 192 days.

(21) Appl. No.: 11/596,483

(22) PCT Filed: Feb. 3, 2006

(86) PCT No.: PCT/DK2006/000058

§ 371 (c)(1),
(2), (4) Date: Nov. 13, 2006

(87) PCT Pub. No.: WO2006/081823

PCT Pub. Date: Aug. 10, 2006

(65) Prior Publication Data

US 2007/0267592 A1    Nov. 22, 2007

(30) Foreign Application Priority Data

Feb. 4, 2005   (DK) ............................... 2005 00172
Nov. 23, 2005  (DK) ............................... 2005 01640

(51) Int. Cl.
*F16K 47/00*   (2006.01)
*F16L 55/02*   (2006.01)
(52) U.S. Cl. ................. 251/121; 251/315.1; 251/315.01
(58) Field of Classification Search ................ 251/118, 251/121, 315.01, 315.07, 315.1, 315.16
See application file for complete search history.

(56) References Cited

U.S. PATENT DOCUMENTS 3,438,387 A    4/1969  Scaramucci 5,070,909 A * 12/1991  Davenport ............. 137/625.32
5,937,890 A *  8/1999  Marandi ...................... 137/271
6,039,304 A *  3/2000  Carlson et al. ............... 251/209

(Continued)

FOREIGN PATENT DOCUMENTS

| EP | 0 503 195 A1 | 9/1992 |
| GB | 1 450 917 | 9/1976 |
| GB | 2 103 767 A | 2/1983 |

*Primary Examiner*—John K Fristoe, Jr.
(74) *Attorney, Agent, or Firm*—William J. Sapone; Coleman Sudol Sapone P.C.

(57) ABSTRACT

A ball valve (10), in particular for controlling the amount of medium supplied to a heating or cooling system, is adapted such that the characteristic of the valve may be determined so that it may be adapted to its use in the heating or cooling system. The ball valve consists of a housing having a ball valve body (4) which is rotatable in two cups (3, 5) of a corresponding ball shape. An insert (7) is arranged at the discharge side of the housing, said insert having a concave ball face which corresponds to that of the ball valve, and which is provided with a slot or recess (10) which, together with the through bore of the ball, defines the outlet opening of the valve. A desired characteristic of the valve may be provided by imparting a suitable shape to the slot (10). The insert is fixed in a holder (6) in the valve housing by means of axially extending teeth (13) in the face of the housing which receives the insert. The teeth generate grooves in the cylindrical contact face of the insert when the insert (7) is pressed into position, whereby it is fixed securely in the circumferential direction. It may be secured in the axial direction by means of rearwardly directed resilient legs (11) which, when the insert is inserted, jump in on the rear side of a recess in the holder. This results in a simple and secure fixing of the insert.

6 Claims, 3 Drawing Sheets

U.S. PATENT DOCUMENTS

| | | | |
|---|---|---|---|
| 6,910,673 B2 * | 6/2005 | Green et al. | 251/118 |
| 7,111,643 B2 * | 9/2006 | Oh | 137/625.41 |
| 7,178,782 B1 * | 2/2007 | York | 251/127 |
| 7,367,544 B2 * | 5/2008 | Oh | 251/208 |
| 2001/0030309 A1 | 10/2001 | Carlson et al. | |
| 2003/0141480 A1 | 7/2003 | Green | |

* cited by examiner

BALL VALVE FOR USE IN HEATING OR COOLING SYSTEMS

THE PRIOR ART

The invention relates to a ball valve, in particular for use in a heating or cooling system for controlling the flow of a medium to be heated or cooled, and which consists of a valve housing having a valve ball which has a through bore, and which is controlled by corresponding ball-shaped cups, and wherein an insert is arranged in the discharge side of the valve housing, said insert engaging the ball in that it has an internal ball-shaped surface corresponding to that of the ball, and wherein said surface is formed with a slot or recess which, together with the through bore of the ball, defines the outlet opening of the valve, so that the shape of this slot or recess determines the characteristic of the valve, i.e. the relation between the angular position of the ball and the flow.

A heating or cooling system, which is to heat or cool a supplied medium, normally water, usually has a heat or cold release which is not linearly dependent on the supplied amount of medium, but follows a characteristic whose shape is determined by the structure of the system.

It is desirable, however, to provide a linear or another determined dependence between the supplied amount of medium and the released heat or cold. The supply of the medium may take place via a ball valve.

Figure 1:
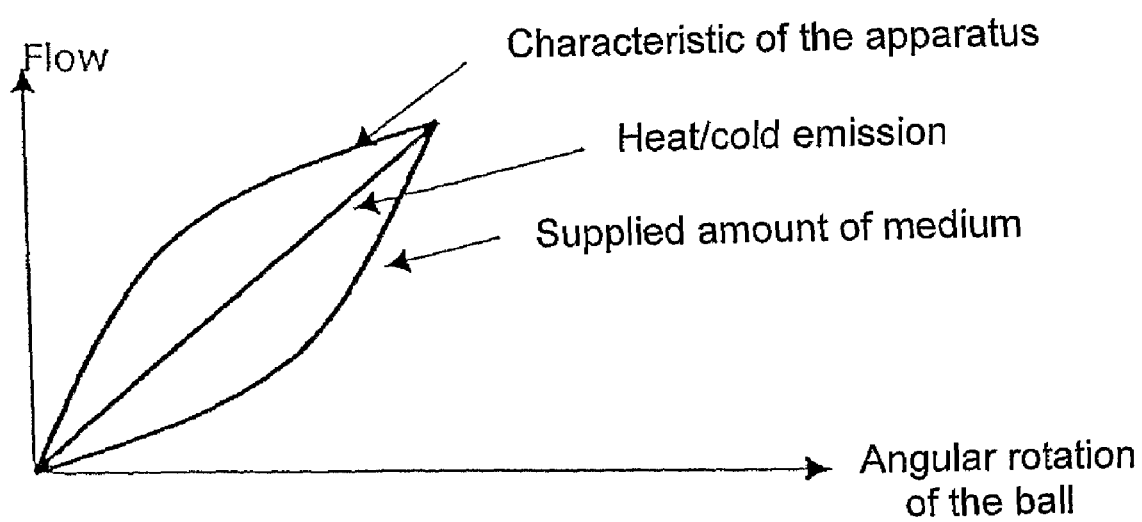

The desired linearity between valve position and released heat or cold may be provided by adapting the characteristic of the ball valve, so that it is "laterally reversed" relative to the characteristic of the system, thereby ensuring that the resulting characteristic is linear (see FIG. 1).

It is known to provide such a desired characteristic for a ball valve by means of an insert which engages the ball in that it has a seat of a shape corresponding to that of the ball, and which, in the seat, has a recess of a shape which gives the desired variation in the amount of the flow when the bore in the ball cooperates with the recess in the rotation. U.S. Pat. No. 6,039,304 discloses such a non-linear ball valve having an insert in the form of a disc with a recess which gives the desired effect.

This insert must be arranged immovably and precisely in the valve housing for the bore in the ball to cooperate safely with the recess in the insert. Usually, it is screwed into the valve housing or arranged with a kind of groove connection and fixed axially with a locking ring, as will be seen in the mentioned US patent.

THE OBJECT OF THE INVENTION

The invention provides a ball valve of the type mentioned above, where the insert is configured particularly expediently, and where it may be fixed easily in the valve housing in the desired position.

This is achieved according to the invention in that, as stated in claim 1, the part of the housing of the valve receiving the insert is provided with axially extending teeth, and that the insert is arranged such that, when the insert is inserted into the housing, the teeth form grooves in the material of the insert.

Hereby, the insert is locked in a simple manner against rotation relative to the housing, without narrow tolerances being required with respect to the angular position of the screwed-in holder in which the insert is normally mounted, or to the insert itself, as is the case if a projection or a tongue and groove connection is used for the connection. The insert is merely pressed into the housing part in the proper position and is immediately fixed. Suitable selection of material and dimensions moreover allow the insert to be readily arranged such that grooves are generated in it by the pressing operation.

As stated in claim 2, the housing part receiving the insert may be internally cylindrical and the insert correspondingly be externally cylindrical. This ensures a good control and fixing of the insert.

When, as stated in claim 3, the said housing part is configured as a holder which is screwed into the actual valve housing, a particularly expedient structure is achieved. As mentioned, it is not important which precise angular position this holder has when it has been screwed completely in, because the insert is subsequently fixed by means of the mentioned teeth on the inner side of the holder.

As stated in claim 4, at its end facing away from the valve body, the insert may be provided with longitudinal legs which are adapted to cooperate with a recess in the holder. The legs, which are slightly resilient, jump out behind the axial wall of the recess when the insert is pressed into position, and thereby lock the insert in an axial direction and ensure that it remains in the holder.

THE DRAWING

Figure 2:
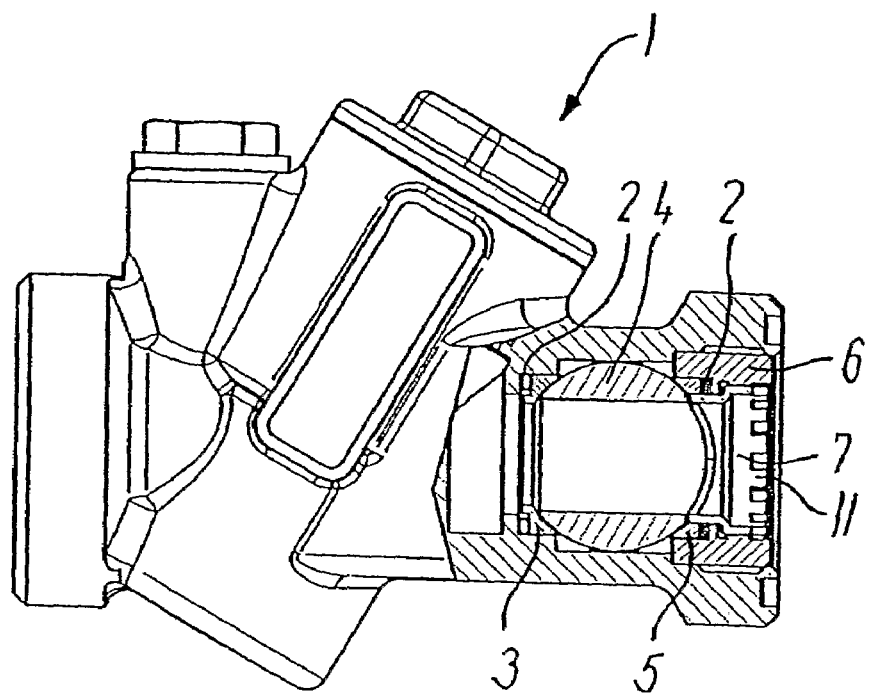
Figure 3:
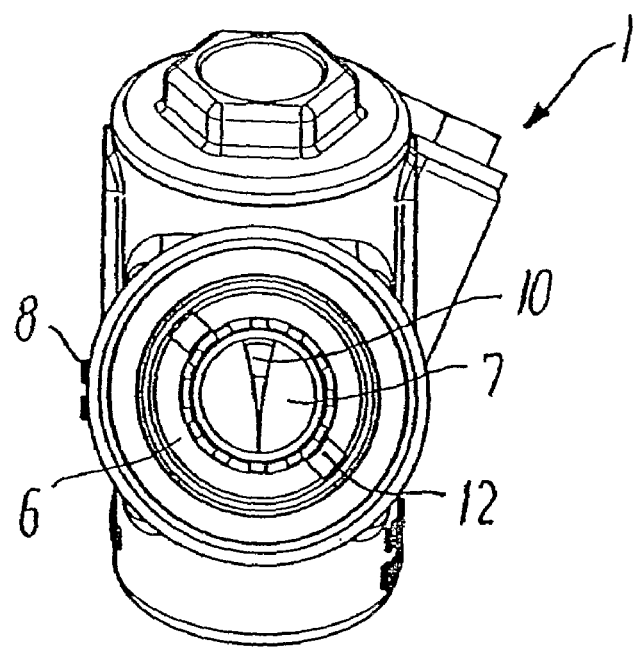
Figure 4:
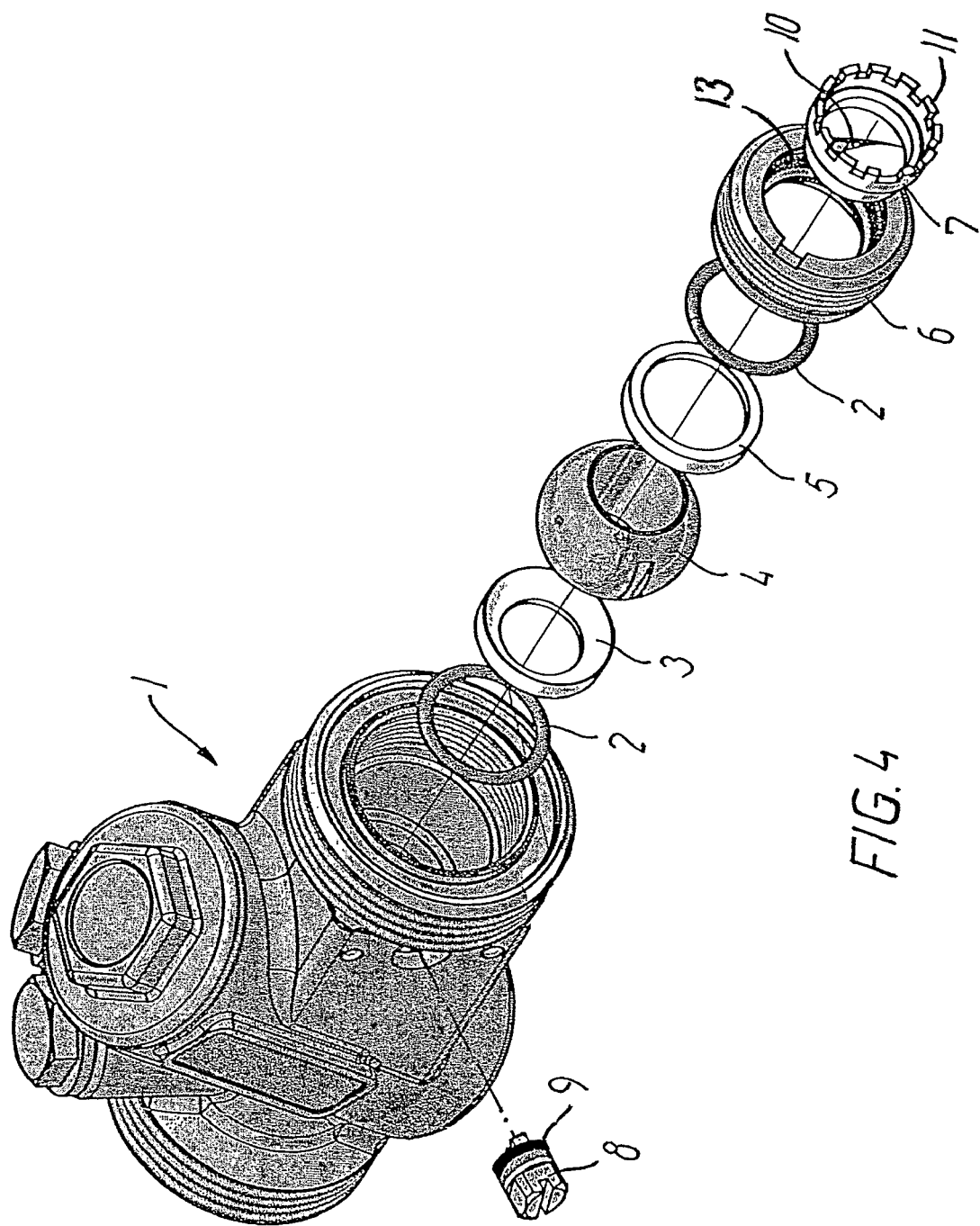

The invention will be explained more fully with reference to the drawing, in which FIG. 1 shows a graph with the characteristics of a heating or cooling system and of the valve as well as the characteristic of the heating or cooling system with the valve according to the invention, FIG. 2 shows the ball valve partly in axial section, FIG. 3 shows the valve seen from the end, and FIG. 4 shows a view of the valve and its elements in perspective.

DESCRIPTION OF AN EXEMPLARY EMBODIMENT

FIG. 1 shows three graphs. The upper one shows the characteristic of the heating or cooling system, and the lower one shows the characteristic of the valve according to the invention which so to peak is laterally reversed relative to that of the apparatus. The central graph shows the resulting characteristic, which is the one that applies to the system with the valve according to the invention.

FIGS. 2 and 3 show the valve 1 with the ball 4 mounted between two cups 3, 5. The cups are clamped together around the ball by means of a holder 6. Two elastic rings 2 are arranged between the valve housing 1 and the one cup 3 and between the holder 6 and the other cup 5. The valve ball is adjusted by means of a spindle 8.

An insert 7 is arranged in the holder 6, it being pressed into the opening of the holder which has a cylindrical face corresponding to the outer face of the insert. At the side facing toward the valve ball, the insert has a cup-shaped face which corresponds to the ball face, and which is formed with a slot or recess 10. Together with the bore in the ball, the slot defines the outflow characteristic of the valve. By imparting a predetermined shape to the slot, a desired characteristic of the ball valve may be achieved.

The manner in which the insert 7 is secured in the holder 6, will be seen best in FIG. 4. The holder has teeth 13 on the face which receives the outer face of the insert. When the insert is pressed into the holder, grooves are generated in the outer face of the insert, whereby the insert is fixed against rotation relative to the holder 6.

Longitudinal legs 11 in the insert 10, which are slightly resilient, cooperate with a recess in the holder when the insert has been pressed completely in, whereby the insert is firmly locked in the axial direction.

The invention claimed is:

1. A ball valve (1) for use in heating or cooling systems, for the control of a flow of a medium to be heated or cooled, the ball valve comprising a valve housing having a valve ball (4) which has a through bore controlled by corresponding ball-shaped cups (3, 5), an insert (7) arranged in a discharge side of the valve housing, said insert engaging the ball and having an internal ball-shaped surface corresponding to a surface of the ball, and wherein said ball-shaped surface is formed with a slot or recess (10) which, together with the through bore of the ball, defines the outlet opening of the valve, the shape of this slot or recess determining the flow characteristic of the valve by the relation between the angular position of the ball and the flow, a part of the housing of the valve receiving the insert, the part of the housing having axially extending teeth (13), the insert is arranged such that, when the insert is inserted into the housing, the teeth form grooves in the insert.

2. The ball valve according to claim 1 wherein said part of the housing of the valve is shaped as an internal cylindrical face, the insert (7) having a corresponding external cylindrical face.

3. The ball valve according to claim 2 wherein said housing part is a separate holder (6) which is screwed into the valve housing.

4. The ball valve according to claim 3 wherein the insert (7), at an end facing away from the valve body, has longitudinal legs adapted to cooperate with a recess in the holder when the insert has been inserted completely.

5. The ball valve according to claim 1 wherein said housing part is a separate holder (6) which is screwed into the valve housing.

6. The ball valve according to claim 5 wherein the insert (7), at an end facing away from the valve body, has longitudinal legs adapted to cooperate with a recess in the holder when the insert has been inserted completely.

* * * * *